US008484806B2

(12) United States Patent
Rarick

(10) Patent No.: US 8,484,806 B2
(45) Date of Patent: Jul. 16, 2013

(54) ERGONOMIC HAND GRIP

(75) Inventor: Gregory S. Rarick, Kutztown, PA (US)

(73) Assignee: Boyesen Engineering, Lenhartsville, PA (US)

( * ) Notice: Subject to any disclaimer, the term of this patent is extended or adjusted under 35 U.S.C. 154(b) by 55 days.

(21) Appl. No.: 13/241,985

(22) Filed: Sep. 23, 2011

(65) Prior Publication Data

US 2012/0073086 A1 Mar. 29, 2012

Related U.S. Application Data

(60) Provisional application No. 61/387,044, filed on Sep. 28, 2010.

(51) Int. Cl.
*B25G 1/10* (2006.01)

(52) U.S. Cl.
USPC ............................... 16/431; 16/421; 74/551.9

(58) Field of Classification Search
USPC ......... 16/421, 430, 110.1, 431, 436, DIG. 12; 74/551.9, 558.5, 543, 551.1; 81/489, 177.1
See application file for complete search history.

(56) References Cited

U.S. PATENT DOCUMENTS

| | | | | |
|---|---|---|---|---|
| 296,973 | A | 4/1884 | Kelsey | |
| 2,788,676 | A | 4/1957 | Spexarth | |
| 4,244,602 | A | 1/1981 | Allsop et al. | |
| 4,535,649 | A * | 8/1985 | Stahel | 74/551.9 |
| 4,611,671 | A | 9/1986 | Hansson | |
| 4,739,674 | A | 4/1988 | Hori | |
| 4,972,733 | A | 11/1990 | Olmr et al. | |
| 5,140,867 | A | 8/1992 | Smith | |
| 5,267,487 | A | 12/1993 | Falco et al. | |
| 5,823,069 | A | 10/1998 | Roark et al. | |
| 5,893,297 | A | 4/1999 | Rowe | |
| 6,263,759 | B1 | 7/2001 | Hollingsworth et al. | |
| 6,615,688 | B2 * | 9/2003 | Wessel | 74/551.9 |
| 6,893,366 | B2 | 5/2005 | Falone et al. | |
| 7,013,533 | B2 | 3/2006 | Lumpkin | |
| 7,347,121 | B2 | 3/2008 | Wu | |
| 7,712,394 | B2 | 5/2010 | Wu | |
| 7,891,270 | B2 * | 2/2011 | Higashi | 74/551.9 |
| 8,234,952 | B2 * | 8/2012 | Ting | 74/551.9 |
| 8,250,714 | B2 * | 8/2012 | Ming-Chang | 16/421 |
| 2008/0156139 | A1 * | 7/2008 | Lai | 74/551.9 |
| 2010/0126301 | A1 | 5/2010 | Yu | |

* cited by examiner

*Primary Examiner* — William L. Miller
(74) *Attorney, Agent, or Firm* — Howson & Howson LLP

(57) ABSTRACT

An ergonomic hand grip assembly is provided for attenuating shocks and impacts and reducing discomfort occasioned by use. The assembly includes a novel slotted sleeve member disposed between an elastomeric outer cover and an inner control member.

15 Claims, 3 Drawing Sheets

FIG. 3
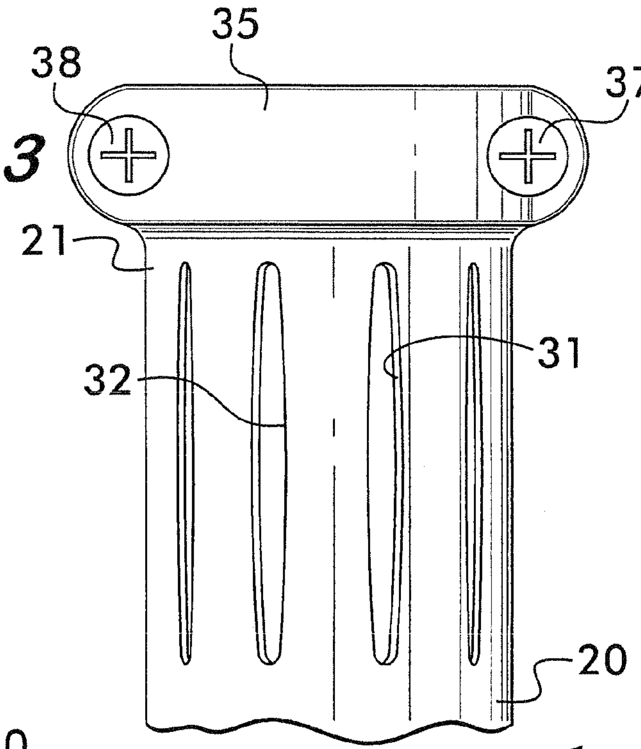
FIG. 4
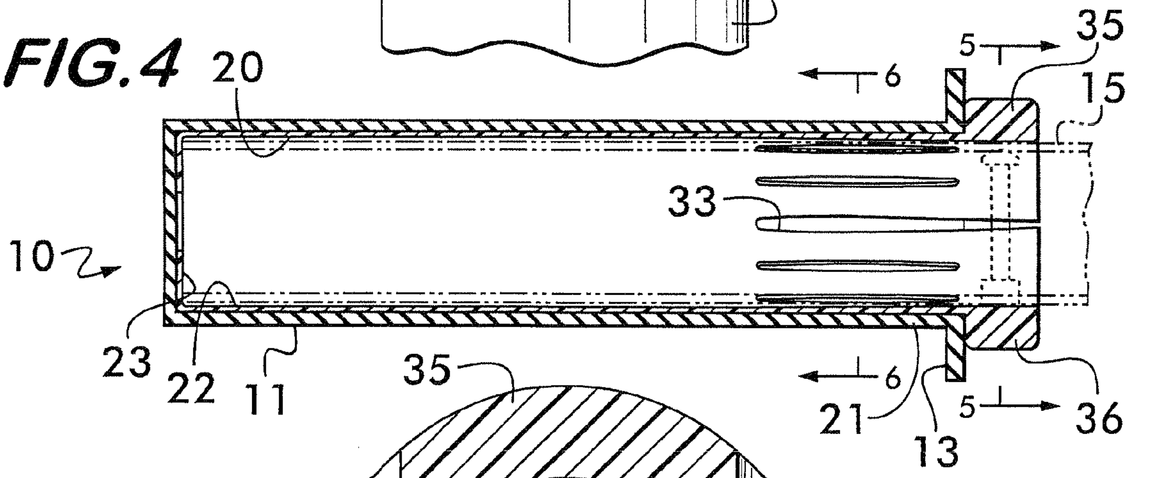
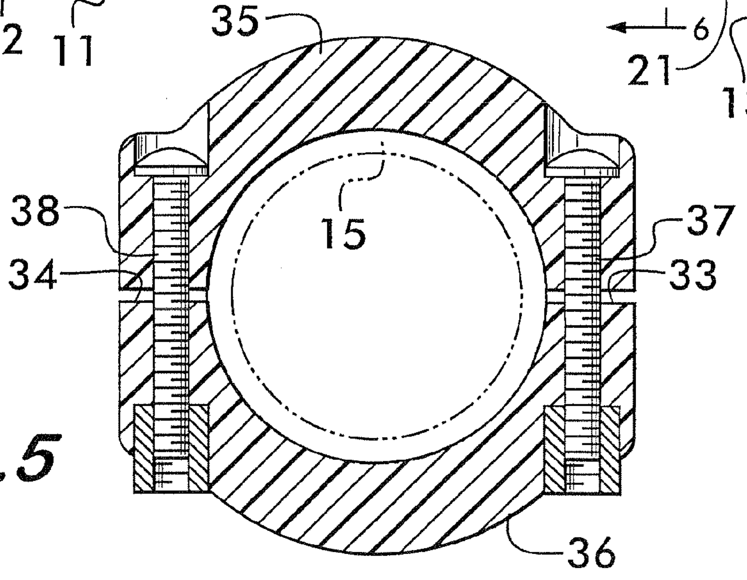
FIG. 5

FIG. 6
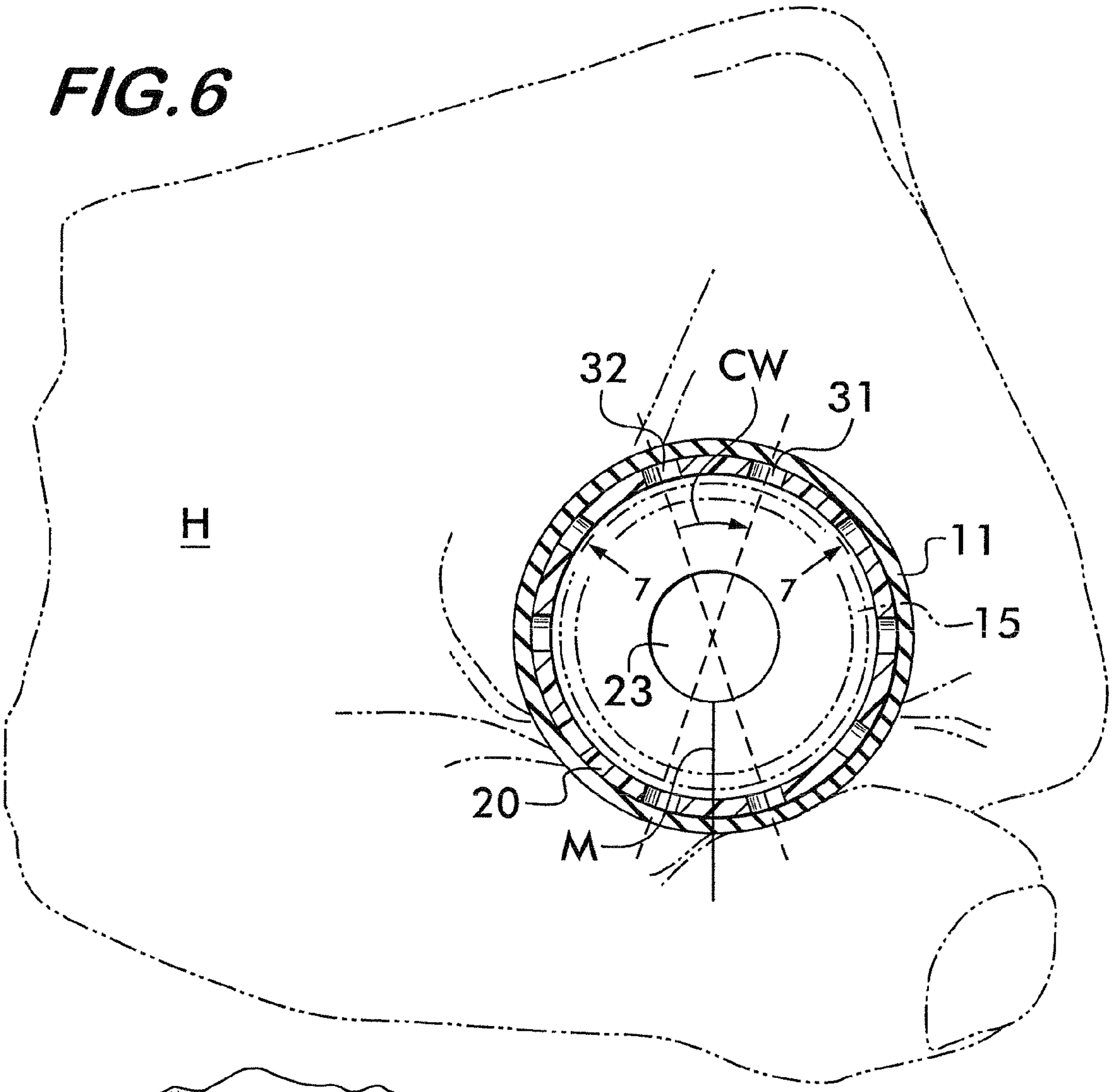
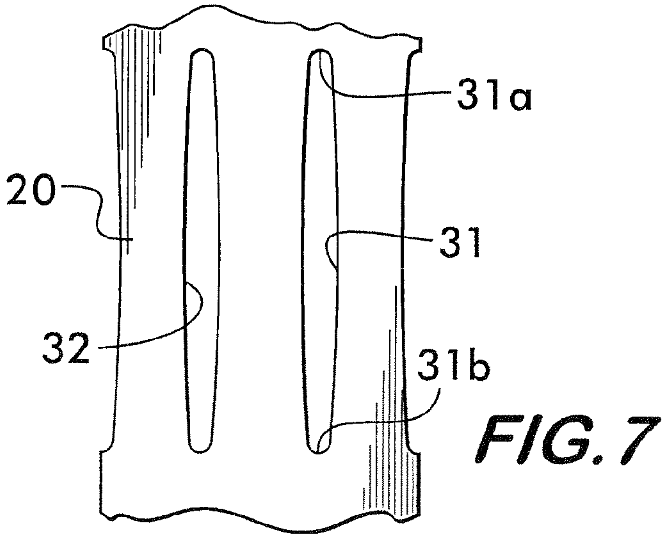
FIG. 7

ERGONOMIC HAND GRIP

CROSS-REFERENCE TO RELATED APPLICATIONS

This application claims the benefit under 35 USC §119(e) of U.S. Provisional Patent Application No. 61/387,044, filed Sep. 28, 2010.

BACKGROUND OF THE INVENTION

The invention relates to shock and impact-attenuating hand grips. More specifically, the invention relates to hand grips particularly suited for use with machines that tend to transmit shocks to the musculoskeltal extremities of the machine operator, such as the handle bars of motorcycles, off-road mountain bikes, all-terrain vehicles, and the like.

In off-road cycling, whether self-propelled, as in mountain biking, or powered by an internal combustion engine, as in a motorcycle, or riding an all terrain vehicle (ATV), the rider tends to grip the handle bars tightly for balance and control. Under competitive conditions, the rider may need to enhance his/her grip for prolonged periods of time while traversing difficult terrain conditions. Such tight gripping by the rider tends to cause shocks and impacts, to be transferred to the rider's hands, wrists, forearms and related musculoskeletal extremities that need to twist as and the handle bars are pivoted toward and away from the rider. Over a period of time, these various forces can induce fatigue, and fatigue can compromise riding enjoyment and competitive results in racing.

Although attempts have been made to provide handle-bar grips that are comfortable to use, ones that are too-soft do not provide adequate motion control. Ones that provide good motion control tend to be too-stiff to be comfortable. Thus, there is a need for a handle bar grip that is comfortable to use, that provides precise motion control, that has good endurance, and that can be readily retro-fitted on existing handle bars.

A primary object of the invention is to provide a novel hand grip assembly that includes a durable mounting sleeve located between an outer elastomeric grip and an inner handle bar for attenuating shocks and vibrations from the handle bar and for accommodating precise movement of the handle bar while being gripped tightly by the user.

BRIEF DESCRIPTION OF THE DRAWINGS

The foregoing objects, features and advantages of the invention should become apparent from the following description taken in conjunction with the following drawings in which:

FIG. 3 is an enlarged fragmentary plan view of one of the components of the assembly illustrated in FIG. 1;

FIG. 4 is a longitudinal sectional view, in reduced scale, taken on line 4-4 of FIG. 1;

FIG. 5 is a greatly enlarged sectional view taken on line 5-5 of FIG. 4;

FIG. 6 is view, similar to FIG. 5, but illustrating the grip engaged by a user's hand shown in phantom lines; and FIG. 7 is a developed fragmentary plan view of the grip assembly taken between lines 7-7 of FIG. 6;

DESCRIPTION OF PREFERRED EMBODIMENT

Figure 1:
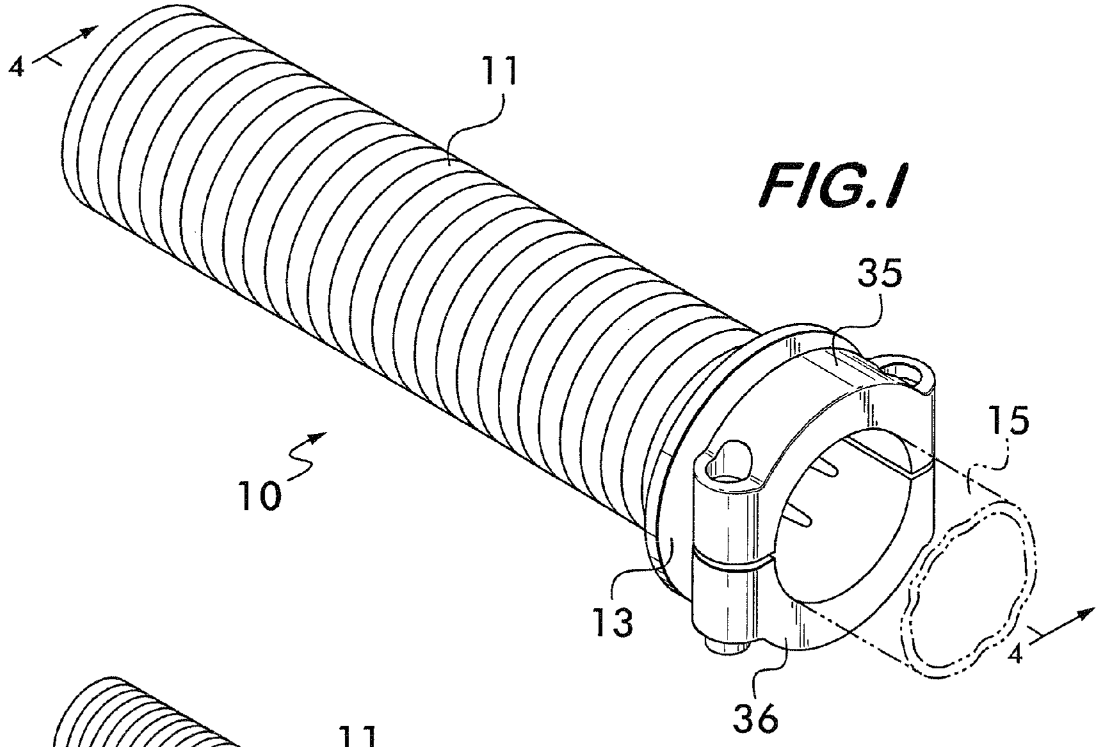
FIG. 1 is a perspective view of an ergonomic hand grip assembly mounted on a tubular handle bar shown in phantom lines.

FIG. 1 illustrates an ergonomic hand grip assembly 10 constructed in accordance with the invention. As best seen in FIG. 1, the assembly includes an outer resilient cover 11 having an open proximal end 12 surrounded by an annular flange 13. The cover 11 is preferably molded of elastomeric material, such as rubber, that provides a satisfactory co-efficient of friction with respect to the palm of a human hand H when gripped as shown in FIG. 6 adjacent the cover flange 13. The elastomeric material is of conventional rubber-like composition known in art for use on outdoor equipment having a handle bar control member 15, such as illustrated in phantom lines in FIGS. 1 and 2. The control member 15 has a free end portion 16 which is moveable by a user's hand H to provide control motion inputs to a vehicle (not shown) and to assist the vehicle rider in maintaining balance while riding the vehicle.

Figure 2:
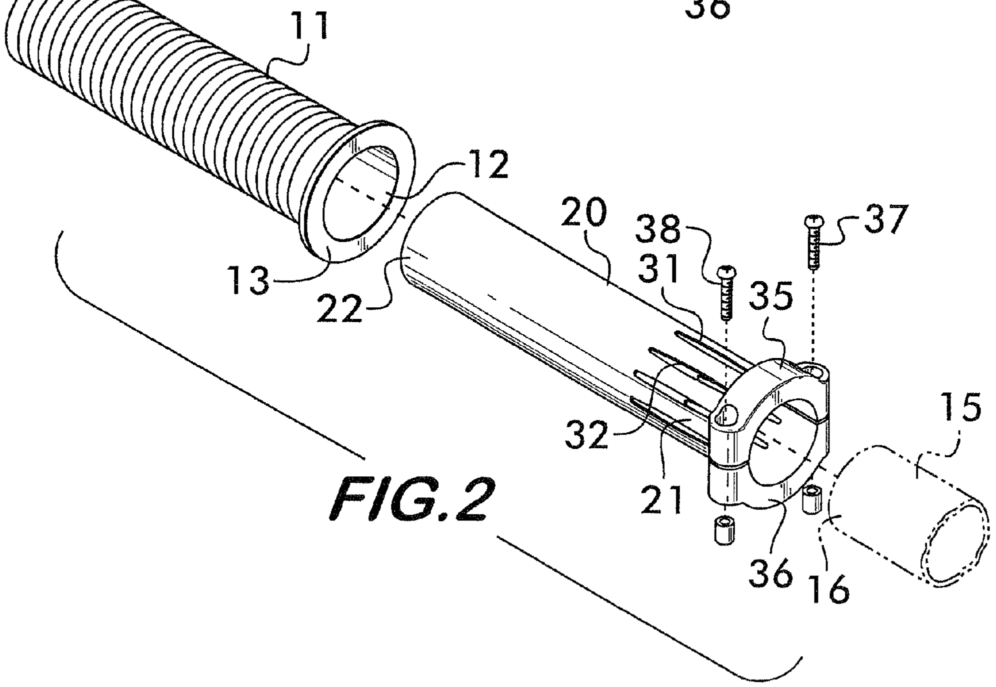
FIG. 2 is an exploded perspective view in reduced scale of the ergonomic hand grip assembly illustrated in FIG. 1.

In order to isolate unwanted shocks and impacts that would normally be transmitted to a user's hand by a conventional grip, the preferred embodiment of the invention includes a novel sleeve member 20 interposed between the control member 15 and the resilient cover 11. As best seen in FIG. 2, the sleeve member 20 is elongate and tubular and has a proximal end portion 21 and a distal end portion 22. The sleeve member 20 has a length which is slightly longer than the width of a large human hand, to accommodate various hand sizes of riders. A length in a range of about 4-6 inches is adequate for most applications.

The proximal end portion 21 of the sleeve member 20 is disposed toward the vehicle steered by the handle bar 15. The distal end portion 22 is disposed away from the vehicle. The proximal end portion 21 of the sleeve member 20 is adapted to telescopically receive the free end portion 16 of the handle bar control member 15. The distal end of the sleeve has an end wall 23 (FIG. 4) which is adapted to engage the end of the handle bar when fully telescopically engaged as illustrated in FIG. 4 with the resilient cover 11 in place.

To provide a highly desirable level of interaction between the handle bar and the outer cover, the sleeve member 20 is provided with a series of apertures which are preferably elongate slots, 31, 32 (FIG. 3, FIG. 7) adjacent its proximal end portion. Each slot extends completely through the sleeve wall, and each slot is open throughout its entire extent. The elastomeric cover spans across the slots. The size, shape, number, and spacing of the slots is selected to provide the sleeve 20 with a substantially linear elastic torsional spring rate on the order of about two (2) pound inches per degree of angular deflection in opposite clockwise and counterclockwise directions relative to a neutral un-stressed condition. In other words, within a total range of angular deflection of 45 degrees, 22.5 degrees clockwise, such as in the clockwise direction CW as shown in FIG. 6, and 22.5 degrees counterclockwise relative to a relaxed, unstressed state M, the amount of angular deflection increases at a linear rate with respect to applied torque. A preferred material for the sleeve member 20 is a thermoplastic polyamide, such as "nylon 12", which is readily moldable into the sleeve configuration illustrated.

The elongate slots 31, 32 provide the desired level of elastic torsional deflection and fatigue resistance. To this end, the slots 31, 32 are elongate lengthwise of the sleeve and define a series of elongate, somewhat hour-glass shaped strips of sleeve wall material between them. The slots extend for a distance of less than about one-half the overall length of the sleeve, and more preferably, they extend for less than about one-quarter of the overall sleeve length. Preferably, the sleeve has an overall tubular length of about 4 inches, a diameter of about one inch, and a wall thickness of about 0.060 inch.

A majority of the slots have a length of about one (1) inches and a maximum medial width of about 0.1 inch. Each of the slot side walls bows outwardly from opposite curved ends such as 31*a*, 31*b* toward the median of each slot. The slots have a length to average medial width ratio of about 10 to 1.

A pair of the slots, located diametrically opposite one another 33, 34 are open at their proximal ends to accommodate a clamping action provided by a pair of integral semi-circular collar portions, 35, 36 connected together by a pair of clamping screws 37, 38. When the screws are tightened, the collar portions 35, 36 tightly engage the handle bar 15 to mount the assembly in place.

In the preferred embodiment illustrated, the slots are equally spaced apart in the body of the sleeve 20, on centers of about 0.2 radians. All of the majority of slots have an identical closed-ended shape, and there are eight (8) in number. The slots extend in side-by-side relation about the periphery of the sleeve 20. With the two open end slots, the total number of slots is ten (10). A slightly greater, or lesser, number of apertures may be provided, and their shapes may be varied, but with some degradation in performance from the best mode as disclosed.

The sleeve member 20 extends closely adjacent the outer surface of the control handle bar 15 with a clearance on the order of 0.010 inch. See FIG. 6. The cover 11 tightly engages the outer surface of the sleeve 20. The coefficient of friction between the sleeve member 20 and the handle bar 15 is less than the coefficient of friction between the sleeve member 20 and the resilient cover 11. This provides a desired level of rotational motion between the sleeve 20 and the control member 15 even when the resilient cover 11 is tightly gripped in the manner as illustrated in FIG. 6, and when the cover 11 is twisted.

Torsional fatigue tests on a prototype of the preferred embodiment exhibited an endurance of only slightly less than 500,000 cycles at a maximum total torsional deflection of 30 degrees, i.e. 15 degrees clockwise and 15 degrees counter-clockwise, on opposite sides of torsionally unstressed neutral datum.

In the disclosed embodiment, all the slots are open and extend completely through the sleeve wall. There may be situations in which the user may wish to tune the grip to suit the user's personal preference for various conditions of use. In such event, the sleeve may be manufactured with slots that do not extend completely through the wall, but which have thin-walls as-manufactured, that can be broken away, or punched through with a hand tool, to enable less than all the slots to be opened-up for adjusting the performance characteristics of the sleeve.

In view of the foregoing, it should be apparent that the disclosed embodiment of the invention provides a durable and comfortable grip that is capable of being manufactured economically.

While a preferred embodiment has been described in detail, various modifications, alterations and changes may be made without departing from the spirit and scope of the invention as defined in the appended claims.

The invention claimed is:

1. A shock and impact damping sleeve for mounting an elastomeric grip to a handle bar, said sleeve having:

an elongate thermoplastic tubular portion of a predetermined length with a proximal end for telescopically mounting on the handle bar with a clearance therebetween, said tubular portion for insertion within said elastomeric grip, said tubular portion having a split collar portion adjacent said proximal end for fastening said sleeve to said handle bar, a plurality of apertures extending distally from said collar portion in spaced relation about a sleeve periphery for a distance of less than about one-half the sleeve length, all of said apertures being of substantially the same shape and uniformly spaced apart about the sleeve periphery, said apertures providing said sleeve with a substantially linear torsional spring rate within a range of about 45 degrees of total angular deflection measured at a distal end of the sleeve remote from said collar portion.

2. Sleeve according to claim 1 wherein said torsional spring rate is on the order of about two (2) pound inches per degree of angular deflection.

3. Sleeve according to claim 1 wherein said sleeve periphery is circular and said apertures are spaced apart on centers of about 0.2 radians.

4. Sleeve according to claim 1 wherein said apertures extend lengthwise for less than about ¼ the length of the sleeve.

5. Sleeve according to claim 1 wherein said sleeve has a length/diameter (l/d) ratio on the order of about 4/1.

6. Sleeve according to claim 1 wherein said sleeve has a uniform wall thickness on the order of about 0.060 inch for substantially its entire length.

7. Sleeve according to claim 1 wherein said sleeve has a transverse wall at said distal end.

8. Sleeve according to claim 1 wherein said sleeve has a fatigue life on the order of 500,000 cycles at a torsional deflection in a total range of 30 degrees relative to a torsionally unstressed neutral datum.

9. Sleeve according to claim 1 wherein said thermoplastic is a polyamide.

10. Sleeve according to claim 9 wherein said polyamide is nylon 12, and said sleeve is molded thereof.

11. Sleeve according to claim 1 wherein the coefficient of friction between said elastomeric grip and said sleeve is greater than the coefficient of friction between said sleeve and said handle bar.

12. A shock and impact damping sleeve for mounting an elastomeric grip to a handle bar, comprising:

an elongate thermoplastic tubular portion of a predetermined length with a proximal end for telescopically mounting on the handle bar with a clearance therebetween, said tubular portion for insertion within said elastomeric grip, said tubular portion having a split collar portion adjacent said proximal end for fastening said sleeve to said handle bar, a plurality of apertures extending distally from said collar portion in spaced relation about a periphery of the sleeve for a distance of less than about one-half the sleeve length, said apertures being elongate slots having opposite ends defining a slot length and have intermediate portions defining a slot width, said slot length and width being in a ratio of about 10 to about 1 (length/width), each end of each of said elongate slots being curved, and each slot having a maximum width dimension located medially between said opposite ends, said apertures providing said with a substantially linear torsional spring rate within a range of about 45 degrees of total angular deflection measured at a distal end of the sleeve remote from said collar portion.

13. Sleeve according to claim 12 wherein said slot width increases from each end and smoothly converges at said maximum medial width.

14. An ergonomic hand grip assembly for use in affording positive motion control inputs to a device while attenuating shocks and impacts from the device to the user comprising:

an elongate control member having a free end portion, an elongate sleeve member surrounding at least a portion of said control member, said sleeve member having a proximal end portion and a distal end portion adjacent said free end portion, a clamp for connecting said members together adjacent said sleeve member proximal end portion, said sleeve proximal end portion having a plurality of lengthwise elongate slots, each slot having a proximal end and a distal end defining a slot length therebetween, said slots being disposed in peripherally-spaced relation distally of said clamp, selected ones of said slots having medially-enlarged portions between the ends thereof, said slot lengths being less than about one-half the overall sleeve member length, said sleeve having a substantially linear torsional spring rate of about two (2) pound inches per degree of deflection measured distally of the distal ends of said slots, and a resilient cover carried by said sleeve member and extending along a substantial portion of the sleeve member for gripping by the user, whereby the sleeve member slots provide limited torsional deflection of the cover relative to the control member when the device is in use, so that the user can effect positive displacement of the control member with minimal transmission of shocks and impacts to the user.

15. Assembly according to claim 14 wherein said sleeve has thin wall break-away portions extending across said apertures for enabling the performance characteristics of grip to be adjusted by the user.

* * * * *